No. 607,317. G. L. WOODWORTH. Patented July 12, 1898.
INTERNAL COMBUSTION ENGINE.
(Application filed June 8, 1897.)

(No Model.)

Witnesses:
Otis B. Wight.
William R. Dudley.

Inventor:
Geo. Lyman Woodworth,
By J. Richards
Atty.

UNITED STATES PATENT OFFICE.

GEORGE LYMAN WOODWORTH, OF STANFORD UNIVERSITY, CALIFORNIA.

INTERNAL-COMBUSTION ENGINE.

SPECIFICATION forming part of Letters Patent No. 607,317, dated July 12, 1898.

Application filed June 8, 1897. Serial No. 639,820. (No model.)

*To all whom it may concern:*

Be it known that I, GEORGE LYMAN WOODWORTH, a citizen of the United States, residing at the Stanford University, in the county of Santa Clara and State of California, have invented certain new and useful Improvements in Internal-Combustion Engines, of which the following is a specification.

This invention relates to gas or oil engines and to means for reducing the loss of heat to the walls confining the working fluid of such engines during the impulse or working stroke.

My invention consists in making the interior surfaces of the cylinders or combustion-chambers of internal-combustion engines with depressions or pits therein or with crossing ribs or ridges thereon and in filling or inlaying such depressions or pits with refractory heat non-conducting material, as will be more fully hereinafter described.

By inlaying the non-conducting or insulating material said material is secured firmly in place, and each portion of the insulating material is also permitted to expand independently and provide for a difference of expansion between said material and the metal.

By placing the insulating material upon the interior surfaces of the walls the hot gases are directly insulated.

In applying the insulating material the metal surface to be covered should be cleaned thoroughly—for example, cast-iron should be scoured with sharp clean sand and dilute sulfuric acid, so as to remove all scale and oxid and then rinsed in clean water.

The insulating material is prepared as follows: Thirty pounds of powdered feldspar and twenty-five pounds of borax are mixed and fused together, cooled and pulverized, and then mixed with ten pounds of kaolin, six pounds of feldspar, and one and three-fourths pound of carbonate of magnesia. The pulverized composition is mixed with enough water to form a paste, which is spread upon the metal surface. Upon this paste dust a fusible powder made by fusing a mixture of 37.5 pounds of quartz, 27.5 pounds of borax, fifty pounds of stannic oxid, fifteen pounds of carbonate of soda, and ten pounds of saltpeter. The insulating material, which has been laid upon the clean metal surface, as above described, is next carefully dried by heat at about 100° centigrade to expel the moisture and baked in a muffle-furnace at a red heat until vitrified. The parts are then removed from the furnace and allowed to cool slowly in the air.

My invention is illustrated in the accompanying drawings, in which—

Figure 1:
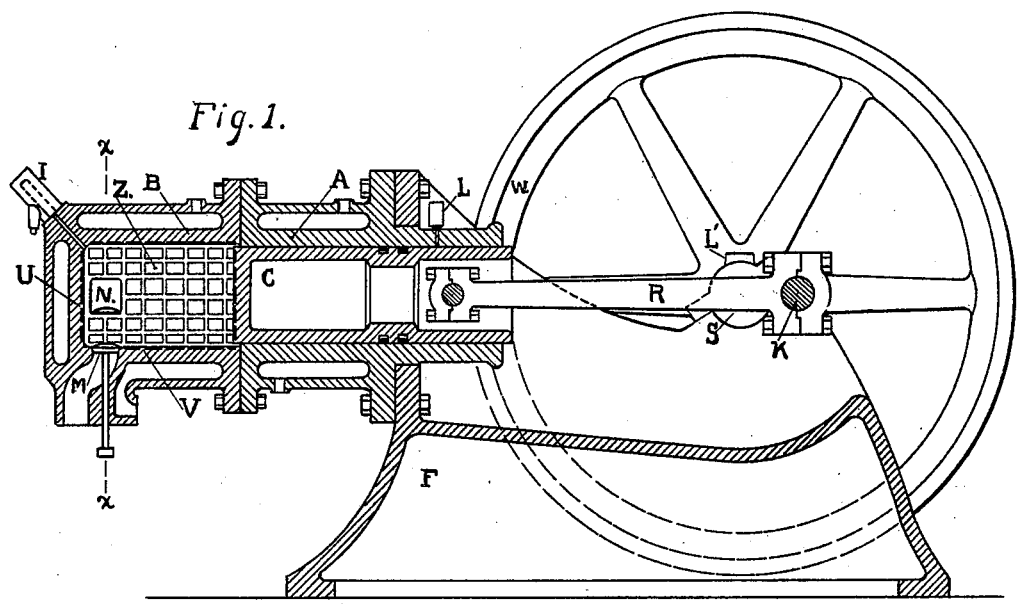
Figure 2:
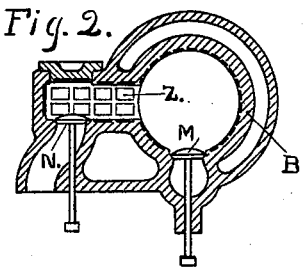
Figure 3:
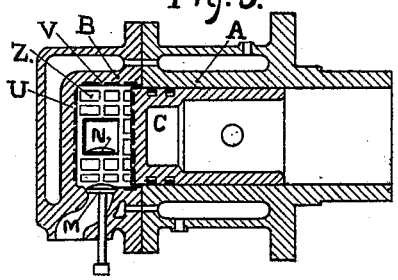
Figure 4:
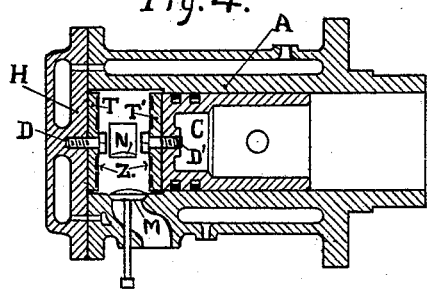

Figure 1 shows a vertical longitudinal section of a gas-engine provided with my improvements. Fig. 2 shows a cross-section on the line $x\ x$ in Fig. 1. Fig. 3 shows a central section through the cylinder of a gas-engine also provided with my improvements. Fig. 4 shows a central section through the cylinder of a gas-engine provided with the detachable insulating-surfaces.

Referring to Figs. 1 and 2, the part marked A is the cylinder. The part marked B forms with the piston marked C the inclosing walls of the combustion-chamber. The insulating material is shown laid in the recesses or pits marked Z. The portions marked U and V are crossing ribs or ridges. The parts marked M and N represent the valves for admission and exhaust. The connecting-rod is marked R, the crank K, the engine-frame F, the flywheel W, the igniter I, and the lubricators L and L'.

In Fig. 1 the inner face of the piston C is inlaid and the piston shown in its outermost position. The interior walls of the combustion-chamber are completely inlaid.

In Fig. 3 the cylinder is marked A, the part B closing its end. The piston C is shown in its innermost position. Only the interior walls of the compression-space are shown inlaid or the combustion-chamber is partially inlaid. The other parts M, N, U, V, and Z are similar to those of Fig. 1.

In Fig. 4 the inlaid plates marked T and T' are attached and are shown secured by the bolts D and D'. The inlaid plate T is affixed to the inner side of the cylinder head or cover marked H. The inlaid plate T' is affixed to the piston C and forms its inner face. The cylinder is marked A and the admission and exhaust valves M and N, respectively.

What I claim, and desire to secure by Letters Patent, is—

1. In an internal-combustion engine, a combustion-chamber made with integral recesses or pits in the interior surface of its walls, which said recesses or pits are filled or inlaid with vitrifiable enamel, substantially as described.

2. In an internal-combustion engine, a combustion-chamber made with integral crossing ribs or ridges on its interior surfaces, and the intervening spaces filled or inlaid with vitrifiable enamel, substantially as described.

3. In an internal-combustion engine, the inner face of the pistons made with integral recesses or pits therein, which said recesses or pits are filled or inlaid with vitrifiable enamel, substantially as described.

4. In an internal-combustion engine, the inner face of the cylinder head or cover made with integral recesses or pits therein, which said recesses or pits are filled or inlaid with vitrifiable enamel, substantially as described.

In testimony whereof I have hereunto affixed my signature in the presence of two witnesses.

GEO. LYMAN WOODWORTH.

Witnesses:
JAMES L. KING,
H. SANDERSON.